Sept. 16, 1952     R. H. SIFFERD ET AL     2,610,625
SURGICAL SPONGE AND THE PREPARATION THEREOF Filed Oct. 14, 1947

Inventors:
Robert H. Sifferd and
Ralph J. Schmitt,

By Carl C. Batz
Attorney.

Patented Sept. 16, 1952

2,610,625

UNITED STATES PATENT OFFICE 2,610,625

SURGICAL SPONGE AND THE PREPARATION THEREOF

Robert H. Sifferd, Clarendon Hills, and Ralph J. Schmitt, Chicago, Ill., assignors to Armour and Company, Chicago, Ill., a corporation of Illinois Application October 14, 1947, Serial No. 779,820

18 Claims. (Cl. 128—156)

This invention relates to a surgical sponge and to the preparation thereof. The invention is particularly useful in the preparation of a sponge from collagen, and the resulting product is unusually effective as a sponge for various types of surgical and other techniques.

An object of the invention is to provide a surgical sponge of sturdy and effective fibrous structure which is effective as a means for stopping the flow of blood or other fluids and which will be absorbed after a time in the body. Yet another object is to provide a new form of sponge having greater physical strength than other protein-containing sponges and of new and highly desirable physical structure. Yet another object is to provide a method for the preparation of such sponge or sponges and in which simple steps are effective for the preparation of the new product. Other specific objects and advantages will appear as the specification proceeds.

The product embodying the invention and as produced by the process of the present invention is illustrated in the accompanying drawing, in which—

Figure 1:
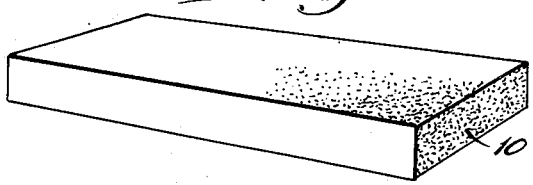
Figure 2:
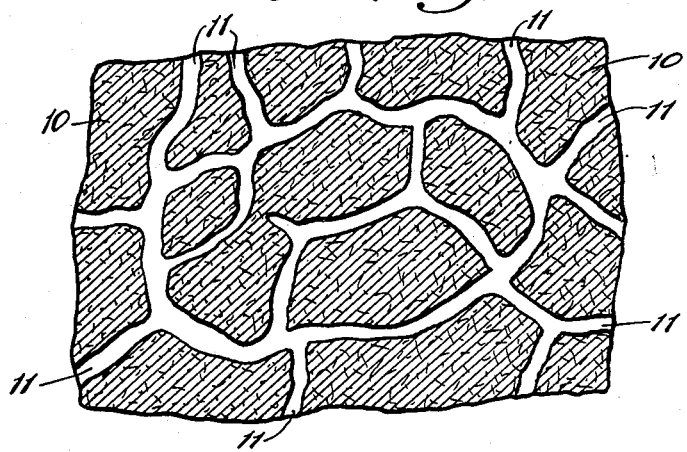
Figure 3:
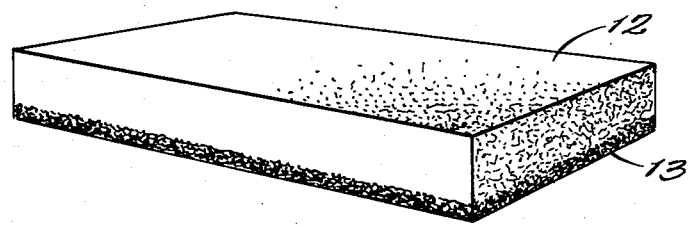

Figure 1 is a perspective view of a sponge embodying our invention; Fig. 2, a greatly enlarged sectional view of a portion of the sponge; and Fig. 3, a perspective view of a modified form of sponge embodying our invention.

In carrying through one phase of our invention, acid collagen gel is first prepared by any suitable method. For example, beef tendons may be cut up into small pieces and allowed to swell in water to which an organic acid, such as dilute acetic acid, is added. The swollen tendons are forced through layers of stainless steel plates or screens under high pressure. The comminuted material thus formed is diluted with water and agitated. The resulting colloidal suspension is centrifuged and the clarified material neutralized with ammonium hydroxide to precipitate the collagen. The precipitated collagen is then washed and treated with an organic acid, say, for example, malonic, acetic, formic acid, etc. The resulting acid collagen gel is then ready for a second step in the process.

The acid collagen gel is next sublimed under vacuum and this step may be carried out with the acid collagen in any suitable concentration. We have found that acid collagen concentrations of .3% to 1.8% solids give excellent results. The sublimation step may be done either with or without incorporating air, and it produces a water-soluble sponge structure.

As a specific example, the acid collagen gel may be poured out in forms which are in contact with dry ice and the gel frozen in blocks within such forms. The blocks of frozen collagen gel are then dried by vacuum sublimation in the usual manner.

The sponge produced by the above treatment may now be further treated to neutralize the organic acid, and preferably to remove the resulting organic salt, while also rendering the sponge water-insoluble.

The neutralizing step may be carried on in any suitable manner. For example, the dehydrated acid collagen sponge may be neutralized by immersing it in a bath of ammoniacal alcohol (2% ammonia, 98% ethyl alcohol (dry)). The ammonia salt of the organic acid dissolves in the alcohol and the neutral collagen sponge remains as a water-insoluble product. It may then be washed with repeated rinsings of dry alcohol and is then ready for surgical application.

Instead of neutralizing with dry ammoniacal alcohol, the water-soluble dehydrated sponge may be neutralized by immersing in cold ammonium hydroxide solution. In this operation, the ammonia neutralizes the organic acid. The product is then washed with water to remove the ammonia and ammonium-organic acid salt.

The sponge may be distributed to the medical profession in dry form and when the sponge is to be used the surgeon may immerse it in a suitable liquid to give it pliability.

The water resistance of the sponge and its resistance to proteolytic enzymes may be increased by treating the sponge with tanning agents, such as formaldehyde, chrome alum, tannic acid, phosphoric acid, etc. The extent of the tanning treatment may be accurately carried out to cause the surgical sponge later to disintegrate in the wound after a selected desired time.

The resulting sponge produced shown in Figs. 1 and 2 consists of a mass of interlocked collagen fibrils 10 separated by channels 11, as shown best in Fig. 2. The collagen fibrils extend in different directions and with heterogenous orientation, the fibrils being interlocked for the most part. The air channels 11 extend through the masses of collagen fibrils and separate them. The product is unusually sturdy, highly effective in preventing the flow of blood and other liquids, while at the same time disintegrating after the same has remained in the body for a time which is predetermined through the use of tanning agents.

The sponge so produced is reticulated and presents a relatively irregular surface of reticular network on all sides. For many uses, it is desired to have a smooth surface on one side of the sponge so that surgical sutures may be secured thereto and retained thereby. We have discovered that the sponge produced as above can be treated so as to provide on one side a smooth surface with a relatively strong skin, the skin serving as a retaining means for surgical sutures, etc. This new result may be obtained as follows:

The acid collagen gel, after being sublimed as above described to form a sponge, is treated on one side with water. The sponge may be dipped in water to any desired depth. Usually a very thin skin is desired, and a very slight penetration of one side of the sponge is thus brought about. The water penetration dissolves the acid collagen that comes in contact with it to produce a continuous gel surface. The entire sponge may then be immersed in an ammoniacal alcohol solution. This will dehydrate as well as neutralize the wet surface while merely neutralizing the sponge side which was not water-treated. The sponge may then be washed with alcohol and dried to make it ready for surgical use. The resulting sponge, as illustrated best in Fig. 3, has a main body 12 formed of reticular network, while the lower surface 13 of the sponge is smooth and provides a skin capable of retaining surgical sutures. The product may be treated with a tanning agent in the manner already described with reference to the sponge shown in Figs. 1 and 2.

Following are specific examples illustrating one particular manner of carrying out the invention.

*Example 1*

To prepare the collagen gel we took 903 gms. of washed, sliced beef tendons and placed the tendons in 0.45 liters of glacial acetic acid dispersed in 17.6 liters of distilled water. The tendons were allowed to swell for 16 hours. The swollen tendons were forced through a perforated plate by means of a hydraulic press. We diluted the extruded tendons to 152 liters with distilled water and stirred vigorously for ½ hour. The diluted solution was put through a centrifuge and the clear solution collected. This amounted to approximately 147 liters of the clear solution.

To the above solution we added 6.14 liters of 2% $NH_4OH$ in several steps, that is, about 3 liters at once and the rest in smaller amounts until the pH of the solution reached 7.0 and a complete precipitation of the collagen occurred.

The above precipitate was separated and washed with 8 volumes of distilled water with gentle stirring. To this precipitate, which amounted to 217.89 gms. dry weight of collagen, we added 72.5 gms. of malonic acid in sufficient water to make 12 kilograms to form the acid-collagen gel.

The above collagen gel was poured into two stainless steel forms 4″ x 6.5″ x 1″ and frozen in a sub-zero cabinet at −70° F. for 1½ hours to freeze the outer surface. The frozen block was removed from the pan and allowed to remain in the cold cabinet for 4 more hours in order to freeze throughout. The frozen blocks were placed in a vacuum oven and sublimed at a pressure below 0.3 mm. Hg at a temperature of approximately 50° F. until dry. The dried sponge was cut into blocks of approximately 2″ x 3″ x ¾″.

One of the blocks was put into a solution of 2% ammonia and 98% ethyl alcohol, and held under the surface for 10 minutes. It was then washed in four 10-minute washes of anhydrous ethyl alcohol. We then allowed it to dry. Another block was put in a 2% ammonium hydroxide solution which was kept cold in a Dry Ice bath. Vacuum was applied for ½ minute to get good penetration of the ammonium hydroxide. We then washed the sponge 4 times with water to remove the organic salt formed.

The block was again frozen and sublimed to maintain its original structure.

*Example 2*

To form a sponge with a collagen gel skin attached we placed a block of the sponge before neutralizing in a pan of water and allowed penetration to a depth of approximately 2.5 mm. We removed from water, neutralized with cold 2% ammonium hydroxide solution and then dried. This gave a skin layer of about 1/20 mm. in thickness.

While in the foregoing description and examples we have set forth specific steps and a structure in detail, it will be understood that such details may be varied widely by those skilled in the art without departing from the spirit of our invention.

We claim:

1. A surgical sponge comprising masses of collagen fibrils having open channels extending therethrough, said sponge being substantially free of elastin and formed animal fibers.

2. A surgical sponge comprising masses of collagen fibrils of heterogenous orientation separated by air channels, said sponge being substantially free of elastin and formed animal fibers.

3. A surgical sponge comprising a reticular network of collagen fibrils extending in different directions and in interlocked relation, with air channels extending throughout the body of the spronge, said sponge being substantially free of elastin and formed animal fibers.

4. A surgical sponge comprising a sponge body having one portion thereof formed of collagen fibrils with open channels extending therethrough to provide a reticular network, one side of said sponge being provided with an integral skin forming a smooth surface for said side.

5. A surgical sponge comprising a sponge body having one portion thereof formed of collagen fibrils with open channels extending therethrough to provide a reticular network, one side of said sponge being provided with an integral skin forming a smooth surface for said side, said skin consisting of a continuous collagen gel surface.

6. A surgical sponge comprising a substantially water-insoluble sponge body consisting of masses of collagen fibrils separated by open channels, said sponge body being tanned to render it resistant to enzymatic action for a predetermined period of time and said sponge being substantially free of elastin and formed animal fibers.

7. In a process for preparing a surgical sponge and in which collagen is precipitated from a collagen-bearing source and treated with an organic acid, the step of freezing the acid collagen gel and then subliming the water therefrom to produce a water-soluble sponge.

8. In a process for preparing a surgical sponge and in which collagen is precipitated from a collagen-bearing source and treated with an organic acid, the steps of freezing the acid collagen gel and then subliming the water therefrom to produce a water-soluble sponge and neutralizing the organic acid to form a neutral and substantially water-insoluble product.

9. In a process for preparing a surgical sponge in which process collagen is precipitated from a collagen-bearing source and treated with an organic acid, the steps of freezing the acid collagen gel and then subliming the water therefrom to produce a dehydrated water-soluble sponge, neutralizing the acid to form a salt of said organic acid, removing the salt, and drying the sponge.

10. In a process for preparing a surgical sponge in which process collagen is precipitated from a collagen-bearing source and treated with an organic acid, the steps of freezing the acid collagen gel and then subliming the water therefrom to produce a dehydrated water-soluble sponge, neutralizing the acid to form a salt of said organic acid, removing the salt, subjecting the sponge to the action of a tanning agent to increase the resistance to body fluids, and drying the sponge.

11. In a process for preparing a surgical sponge in which an acid collagen gel is formed, the steps of freezing the acid collagen gel and then subliming the water therefrom to form a water-soluble sponge, dissolving one side of the sponge with water to form a continuous gel surface, and neutralizing said sponge.

12. In a process for preparing a surgical sponge from an acid colagen gel, the steps of freezing the acid collagen gel and then subliming the water therefrom to produce a water-soluble sponge, applying water to a portion only of said sponge, and neutralizing the acid of said sponge.

13. In a process for preparing a surgical sponge, the steps of preparing an acid collagen gel, placing the gel in forms, freezing the gel to form frozen bodies thereof, and sublimating the water from the frozen bodies under vacuum to form a dehydrated water-soluble sponge.

14. In a process for preparing a surgical sponge, the steps of preparing an acid collagen gel, placing the gel in forms, freezing the gel to form frozen bodies thereof, sublimating the water from the frozen bodies under vacuum to form a dehydrated water-soluble sponge, and neutralizing the acid of said sponge.

15. In a process for preparing a surgical sponge, the steps of preparing an acid collagen gel, freezing the acid collagen gel and then subliming the water therefrom to produce a water-soluble sponge, and immersing the sponge in an ammoniacal alcohol solution.

16. In a process for preparing a surgical sponge, the steps of preparing an acid collagen gel, freezing the acid collagen gel and then subliming the water therefrom to produce a water-soluble sponge, immersing the sponge in an ammonical alcohol solution, washing the sponge, and drying the same.

17. In a process for preparing a surgical sponge in which collagen-bearing material is comminuted, swollen in an aqueous suspension, and neutralized to precipitate the collagen, the steps of treating the collagen with an organic acid, freezing the resulting gel, drying the frozen gel by vacuum sublimation, and neutralizing the acid.

18. In a process for preparing a surgical sponge in which collagen-bearing material is comminuted, swollen in an aqueous suspension, and neutralized to precipitate the collagen, the steps of treating the collagen with an organic acid, freezing the resulting gel, drying the frozen gel by vacuum sublimation, neutralizing the acid to form a water-insoluble sponge, dipping the sponge into an ammonium hydroxide solution, and washing and drying the product.

ROBERT H. SIFFERD.
RALPH J. SCHMITT.

REFERENCES CITED

The following references are of record in the file of this patent:

UNITED STATES PATENTS

| Number | Name | Date |
| --- | --- | --- |
| 191,132 | Garrison | May 22, 1877 |
| 471,343 | Poehl | Mar. 22, 1892 |
| 582,926 | Johnson | May 18, 1897 |
| 652,519 | O'Callaghan | June 26, 1900 |
| 1,548,504 | Becker | Aug. 4, 1921 |
| 2,166,074 | Reichel | July 11, 1939 |

FOREIGN PATENTS

| Number | Country | Date |
| --- | --- | --- |
| 466,064 | Great Britain | May 21, 1937 |
| 487,660 | Great Britain | June 23, 1938 |

OTHER REFERENCES

Pilcher et al., Surg. Gyn. and Obstet., Oct. 1945, pages 365 to 369.